United States Patent [19]

Ashikawa et al.

[11] Patent Number: 4,625,577
[45] Date of Patent: Dec. 2, 1986

[54] MULTI-SPEED TRANSMISSION

[75] Inventors: Noboru Ashikawa; Hiroshi Nakayama; Makoto Sumi, all of Saitama, Japan

[73] Assignee: Honda Giken Kogyo Kabushiki Kaisha, Tokyo, Japan

[21] Appl. No.: 585,987

[22] Filed: Mar. 5, 1984

[30] Foreign Application Priority Data

Mar. 4, 1983 [JP] Japan .................................. 58-35628
Mar. 4, 1983 [JP] Japan .................................. 58-35629

[51] Int. Cl.$^4$ .............................................. G05G 9/10
[52] U.S. Cl. ...................................... 74/475; 74/476; 74/477
[58] Field of Search ................. 74/473 R, 475, 476, 74/477

[56] References Cited

U.S. PATENT DOCUMENTS

| | | | |
|---|---|---|---|
| 1,770,492 | 7/1930 | Peck | 74/477 X |
| 3,015,968 | 1/1962 | Szekely | 74/473 X |
| 3,192,788 | 7/1965 | Fodrea | 74/475 X |
| 4,022,079 | 5/1977 | Hidaka | 74/476 |
| 4,277,983 | 7/1981 | Izumi et al. | 74/477 |
| 4,458,551 | 7/1984 | Winter-Peter | 74/359 X |

Primary Examiner—A. Michael Chambers
Assistant Examiner—John C. Fox
Attorney, Agent, or Firm—Lyon & Lyon

[57] ABSTRACT

A multi-speed transmission having a plurality of forward speed gear trains and at least one reverse speed gear train wherein two parallel shafts, one fixed and the other movable along its axial direction, are mounted within the transmission casing. Shifting forks are mounted on said shafts to selectively engage the forward and reverse speed gear trains. For example, for a multi-speed transmission having five forward speeds and one reverse speed, a first shift fork is slidably mounted on a stationary shaft to selectively engage the first and second gear trains, a second shift fork is slidably mounted on the slidable shaft to selectively engage the third and fourth gear trains and a third shift fork is mounted on the slidable shaft so as to be slidable in only one direction to engage the fifth speed gear train. Movement of the slidable shaft in the direction opposite that which engages the fifth speed gear train acts to engage the reverse speed gear train. The shift forks are retained in their selective position by retaining mechanisms which have retractable protrusions engageable with notches in the shafts.

4 Claims, 13 Drawing Figures

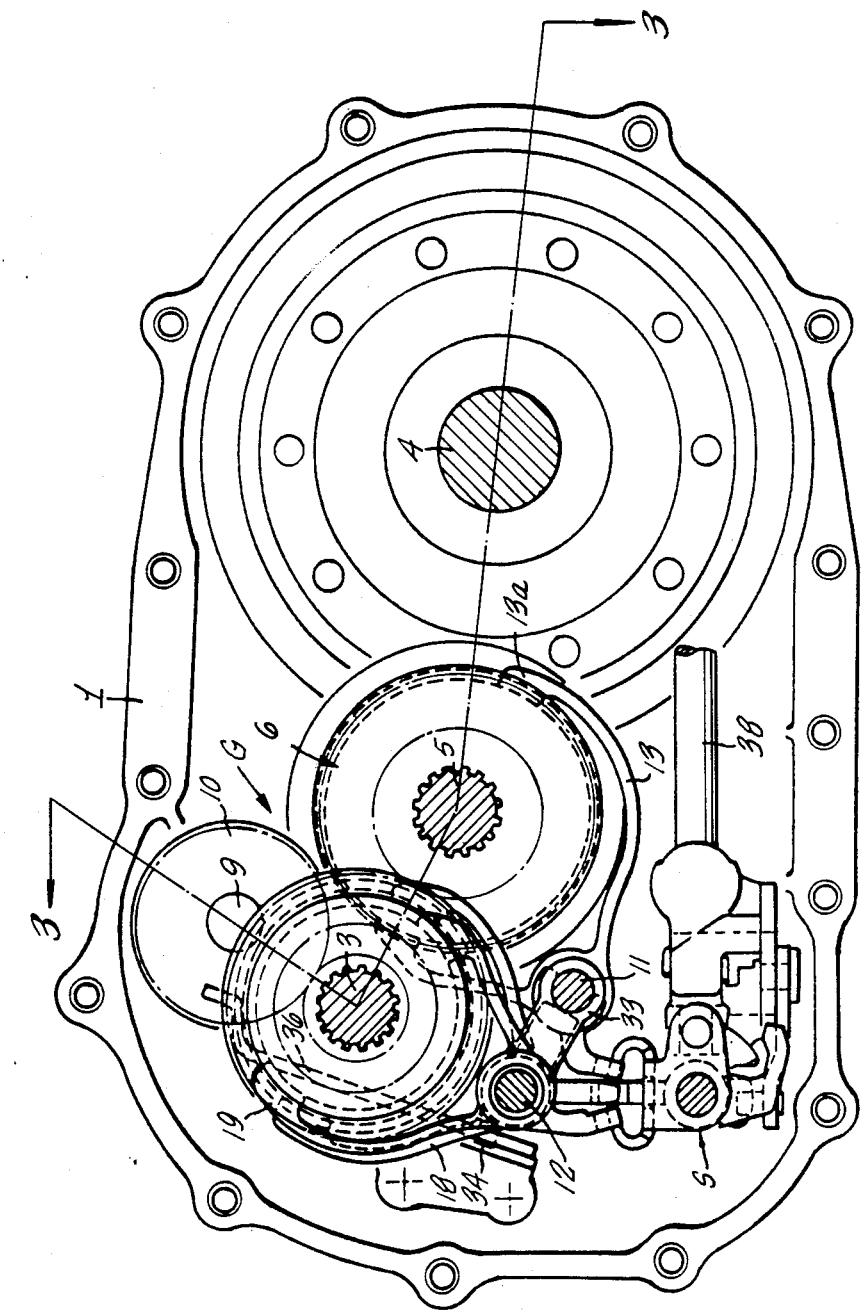

MULTI-SPEED TRANSMISSION

The field of the invention is manual type multi-speed transmissions and more particularly manual type multi-speed transmissions for vehicles having a plurality of forward speeds and at least one reverse speed.

To optimize the performance of an automobile it is desirable to minimize the weight of the vehicle. The need to reduce vehicular weight is a widely known problem within the automotive industry. Generally speaking, the weight of the automobile power units, such as the engine or the transmission, are significant factors in the overall weight of the vehicle. For example, multi-speed transmissions of the manual type having five forward speeds and one reverse speed typically have at least three support shafts and a plurality of shifting forks supported thereon.

The present invention comtemplates the use of two fork shafts within the transmission. One fork shaft is movable in the axial direction; the other fork shaft being affixed within the transmission. Shifting forks are slidably mounted on the shafts to selectively engage and disengage the forward and reverse speeds. The shifting forks are retained in the selected engaged position by retractable means which engage corresponding notches on the appropriate shaft.

It is an object of the present invention to reduce the size and weight of a multi-speed transmission of a manual type.

It is a further object of the invention to reduce the number of component parts, thereby simplifying construction of a multi-speed manual transmission. Other and more detailed objects of the invention will become apparent upon examination of the description and drawings contained herein, wherein:

FIG. 2 is a longitudinal side elevation of a transmission as constructed according to the present invention;

Figure 1A:
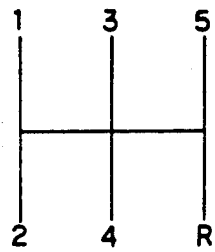
FIGS. 1A and 1B illustrate the shift patterns of a typical multi-speed manual transmission.
Figure 1B:
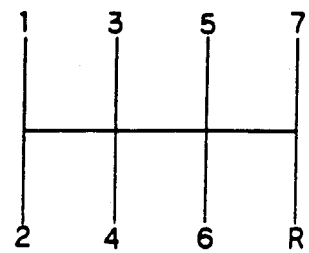
Figure 3:
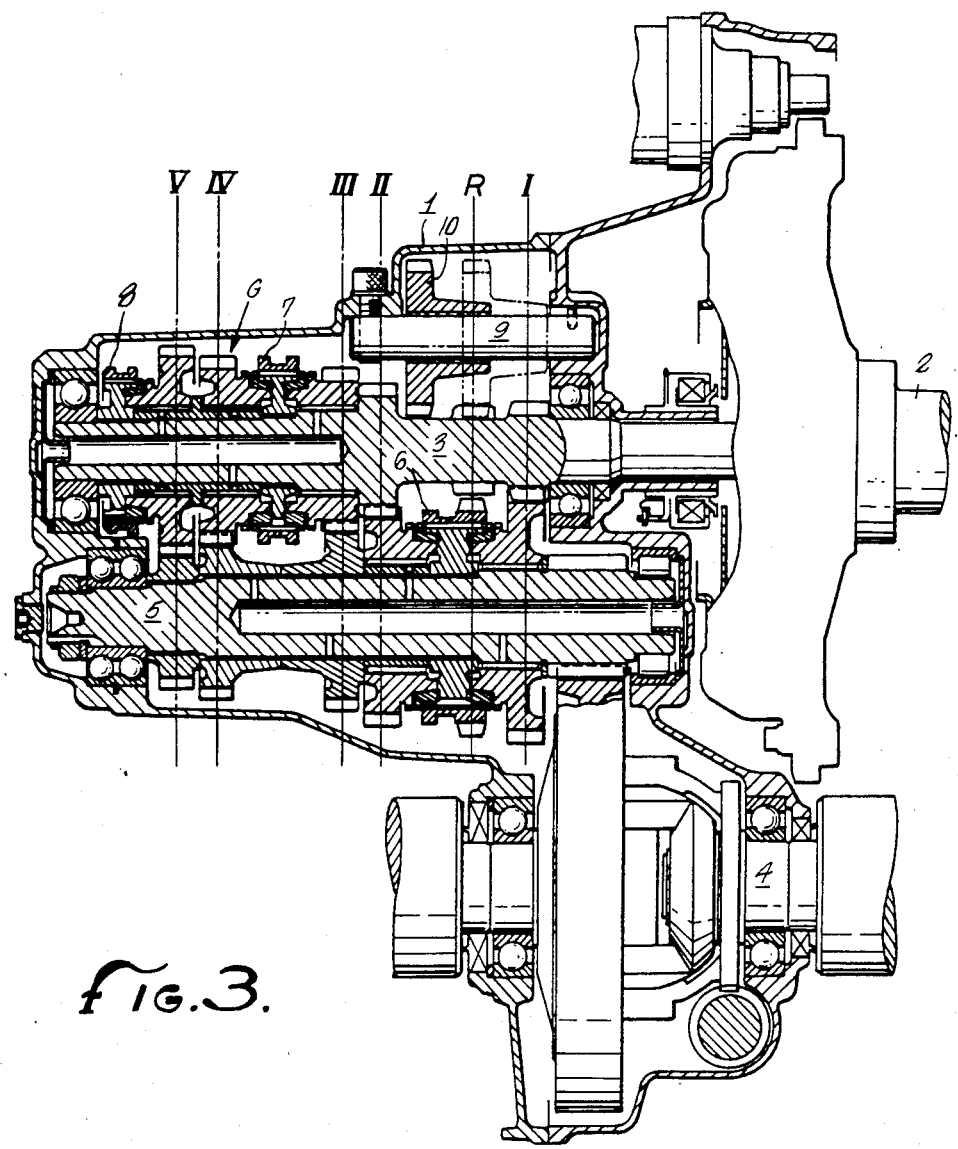
FIG. 3 is a transverse sectional top view taken substantially along line 3—3 of FIG. 2.

The present invention relates to multi-speed manual transmissions having shifting patterns similar to those shown in FIGS. 1A and 1B. For purposes of example, the present invention will be described herein in reference to a manual transmission having five forward speeds and one reverse speed. Referring to FIGS. 2 and 3, there is accommodated in transmission case 1, a multi-speed transmission gear mechanism G having five forward speeds and one reverse speed. This gear mechanism G is well known in the art and will be briefly described in the following.

In the transmission case 1, a series of parallel shafts are rotatably supported and include a main shaft 3 which is connected to the engine crankshaft 2 and a countershaft 5 which is connected to the axle shaft 4. Interposed between the main shaft 3 and the countershaft 5 are a series of gear trains I, II, III, IV, V and R, which represent first to fifth forward speeds and reverse speed, respectively. In addition, an idle gear shaft 9 extending parallel with the main shaft 3 and the countershaft 5 is mounted in the transmission case 1. A reverse idle gear 10 is slidably mounted on the idle gear shaft 9.

Figure 4:
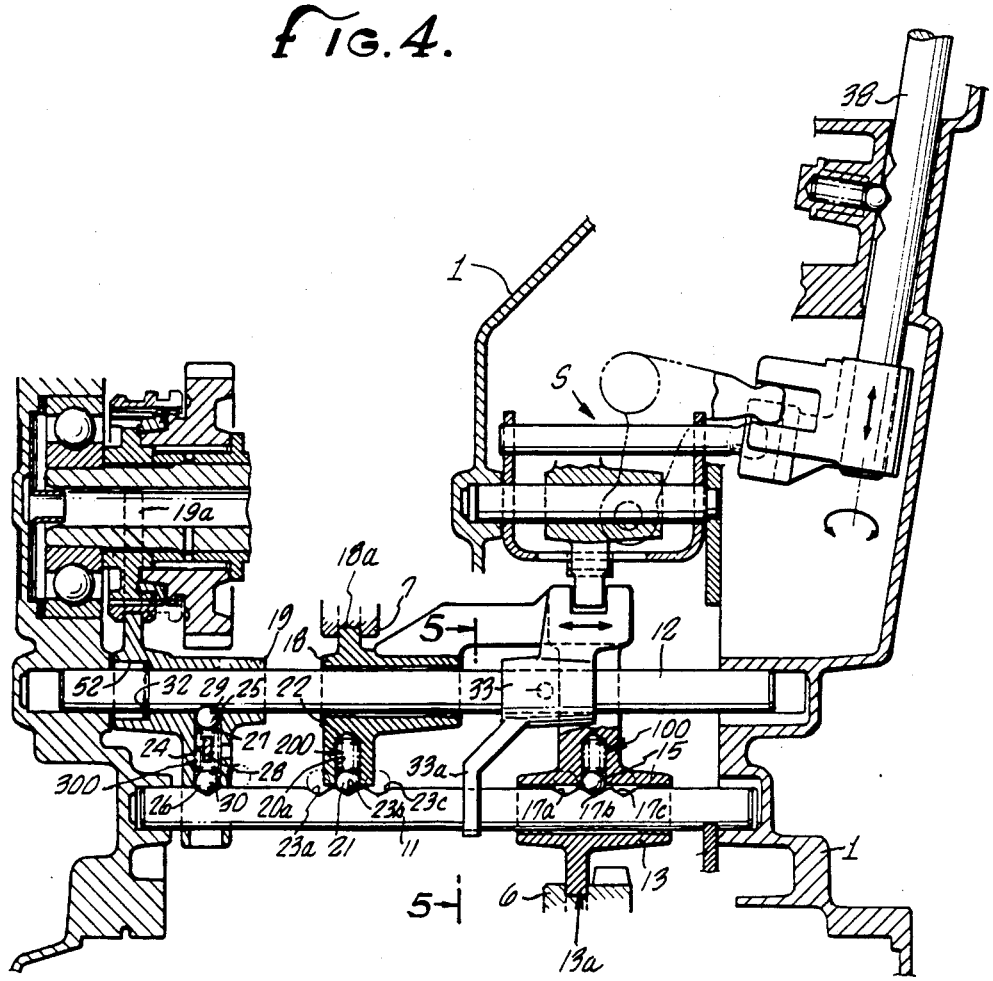
FIG. 4 is an exploded sectional view showing an essential portion of the present invention.

As shown in FIG. 4, a stationary fork shaft 11 is fixedly supported in the transmission case 1. A second fork shaft 12, slidable in the axial direction, is mounted in the transmission case 1 parallel to the stationary fork shaft 11. A first shift fork 13, having its forked portion 13a engaging the aforementioned first speed sleeve 6, is slidably mounted on the stationary fork shaft 11. Said first shift fork 13 is used to selectively engage the first and second gear trains I and II, respectively.

Said first speed gear train I is engaged by sliding the first shift fork 13 to the right of its disengaged neutral position indicated in FIG. 4. Similarly, the second speed gear train II is engaged by sliding the first shift fork 13 to the left of its disengaged neutral position shown in FIG. 4.

Between the base portion of the first shift fork 13 and the stationary fork shaft 11, there is interposed a first retaining mechanism 100 for retaining said first shift fork 13 in its neutral and engaged positions. In the preferred embodiment, the first retaining mechanism 100 includes a retaining chamber 14 which is formed in the base portion of the first shift fork 13. The retaining chamber 14 has one end open to the stationary fork shaft 11. Three notches 17a, 17b and 17c are formed in the stationary fork shaft 11 corresponding to the chamber 14 opening in the first shift fork 13 when the shift fork is in the second speed, neutral, and first speed positions, respectively. The manner in which the retaining mechanism 100 operates will be described below in connection with similar mechanisms.

A second shift fork 18 to accomplish engagement of the third and fourth speed gear trains III and IV, respectively, is slidably mounted on the movable fork shaft 12. The forked portion 18a of the second shift fork 18 is engaged with the second speed sleeve 7 on the main shaft 3. The third speed gear train III is engaged by moving the second shift fork to the right of its disengaged neutral position shown in FIG. 4 while engagement of the fourth speed gear train IV is accomplished by sliding the second shift fork 18 to the left of its disengaged neutral position shown in FIG. 4.

A second retaining mechanism 200 is interposed between the second shift fork 18 and the stationary fork shaft 11. Similar to the first mechanism 100, an internal chamber 20 with an opening to the stationary fork shaft 11 is formed in the base of the second shift fork 18. Three notches 23a, 23b and 23c are formed in the stationary fork shaft 11 corresponding to the internal chamber 20 opening when the second shift fork 18 is in its disengaged neutral position and both of its engaged positions.

A third shift fork 19 is also slidably mounted on the movable fork shaft 12. The forked portion 19a of the third shift fork 19 engages with the third speed sleeve 8 to engage the fifth speed gear train V. Unlike the first and second shift forks 13 and 18, respectively, the third shift fork 19 is mounted so as to be slidable in only one direction from its neutral disengaged position shown in FIG. 4. An internal shoulder 50 is formed by an oversized bore 52 in the third shift fork 19 coaxial with the movable shaft 12. A stopper ring 32 formed on the movable shaft 12 engages with the shoulder 50 to slide the third shift fork 19 to the right. If the movable fork shaft 12 is slid to the right as viewed in FIG. 4, the third shift fork 19 is moved integrally therewith. However, if the movable fork shaft 12 is slid to the left as viewed in FIG. 4, the third shift fork 19 is left immovable due to the transmission casing 1.

A third retaining means 300 is interposed in the third shift fork 19 between the movable fork shaft 12 and the stationary fork shaft 11.

Figure 5:
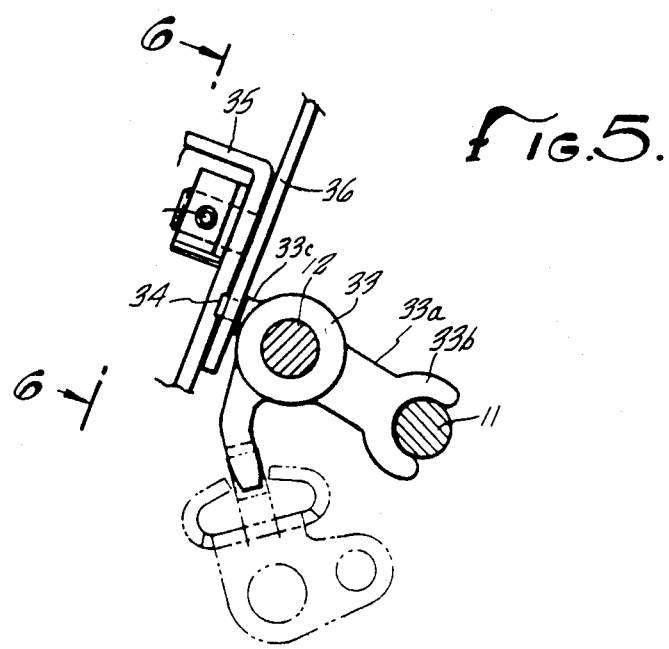
FIG. 5 is a cross-sectional view taken substantially along line 5—5 of FIG. 4.
Figure 6:
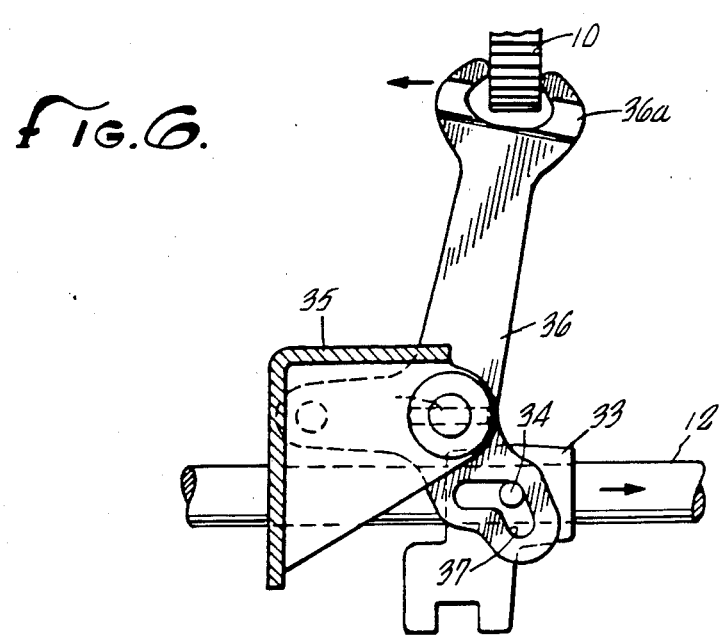
FIG. 6 is a sectional view taken substantially along line 6—6 of FIG. 5.

As shown in FIGS. 4-6, a fifth speed and reverse actuating mechanism including an actuating member 33 is fixed on the movable fork shaft 12. The actuating member 33 has an integral arm 33a extending therefrom. The arm 33a has an end portion 33b which is substantially U-shaped and slidably engages the stationary fork shaft 11.

The actuating member 33 has a boss 33c formed on the opposite side of the member 33 from the integral arm 33a. An engagement pin 34 is integral with, and protudes from, the boss 33c of the actuating member 33. A reverse shift fork 36 is hinged in a swinging manner to the wall 35 of the transmission case 1. As shown most clearly in FIG. 6, the reverse shift fork 36 has a hooked hole 37 into which the engagement pin 34 is fitted. At the end opposite the hooked hole 37, the reverse shift fork 36 is formed with forked claws 36a which embrace the aforementioned reverse idle gear 10. If the movable fork shaft 12 is moved to the right as viewed in FIG. 6, or to the left as viewed in FIG. 4, the reverse shift fork 36 is also swung. This swinging shifts the reverse idle gear 10 and engages the reverse gear train R. The reverse gear train R is shown in the engaged position in phantom in FIG. 3.

A shift lever 38 is used to selectively engage the first shift fork 17, the second shift fork 18 and the reverse actuating member 33 through a known shifting mechanism S.

The retaining mechanisms 100 and 200 for the first shift fork 17 and the second shift fork 19, respectively, are comprised of, in the preferred embodiment, a retaining ball 15 and 21, respectively, and a compression spring 16 and 22, respectively. The spring acts against the closed side of the retaining chamber 14 and 20, respectively, to encourage the retaining ball into the fixed shaft 11 notch corresponding the position of the shift fork. So comprised, the retaining mechanisms 100 and 200, tend to retain the selected position of the shift forks 17 and 19, respectively. It is anticipated that a shape other than that of a ball may be used as a retention means under the spirit of the invention.

Figure 7A:
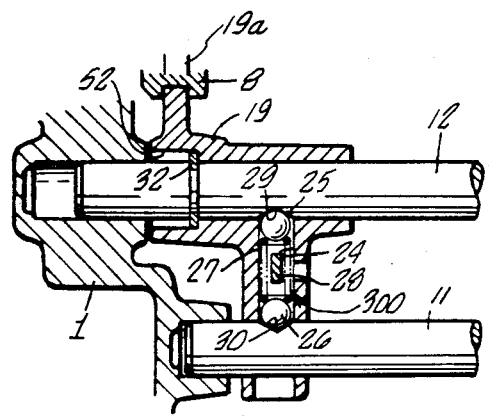
FIGS. 7A, 7B and 7C are sectional views showing the operation of the shift fork retaining means.
Figure 7B:
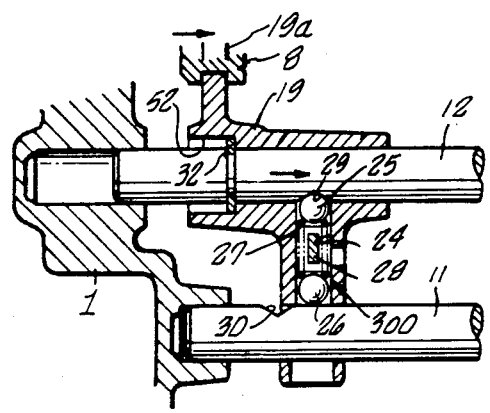
Figure 7C:
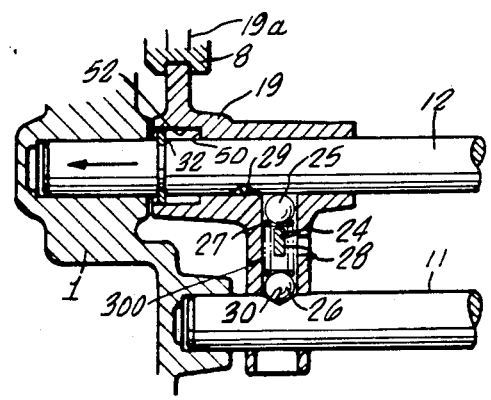
Figure 8:
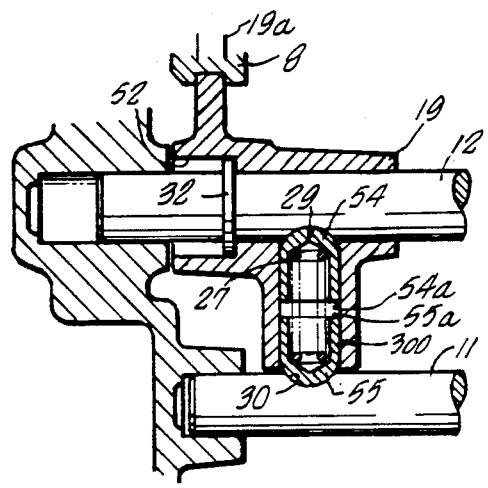
FIGS. 8-10 are alternative embodiments of the shift fork retaining means.
Figure 9:
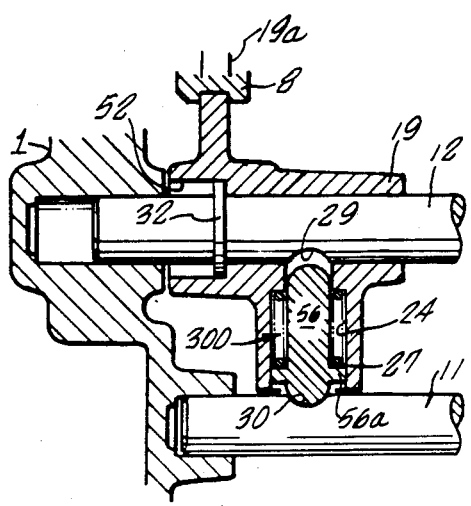
Figure 10:
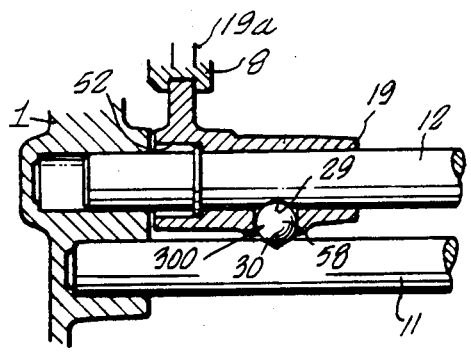

As best shown in FIGS. 7A, 7B and 7C, the retention means 300 of the third shift fork 19 has an internal chamber 24 formed in the third shift fork 19. The internal chamber 24 is open to both the movable shaft 12 and the stationary shaft 11. Notches 29 and 30 are formed in both the movable shaft 12 and the fixed shaft 11, respectively. When the transmission is in its neutral position, the notches 29 and 30 will be vertically aligned. In the preferred embodiment, a retaining pin 28 is formed near the mid-point of the internal chamber to limit the retraction of the retaining means. In this embodiment, the retaining means include a pair of retaining balls 25 and 26, one ball engageable with each of the notches 29 and 30 formed in the movable shaft 12 and the fixed shaft 11, respectively. A compression spring 27 is fitted within the retaining chamber 24 to encourage the retaining means 25 and 26 towards their respective shafts 12 and 11. FIGS. 8-10 show alternative embodiments of the retaining mechanism 300 for the third shift fork 19.

FIG. 8 shows a second embodiment of the retaining mechanism 300 for the third shift fork 19. The second embodiment is different in the construction of the retaining mechanism means from the foregoing first embodiment. More specifically, a first and second lock piece 54 and 55 are fitted within the retaining chamber 24 of the third shift fork 19. A compression spring 27 is mounted between the lock pieces 54 and 55 to encourage them toward the notches 29 and 30 in the movable shaft 12 and the fixed shaft 11, respectively. The hollow lock pieces 54 and 55 are formed such that when both lock pieces 54 and 55 are fully recessed, their backs 54a and 55a, respectively, will abut so as to prevent excessive retraction into the retaining chamber 24.

FIG. 9 shows a third embodiment of the retention mechanism. This embodiment is different in construction from the previous embodiments in that a single lock piece 56 is fitted within the retaining chamber 24. The lock piece 56 has spherical engagement portions at its upper and lower ends. The lock piece has a shoulder 56a formed near the end which engages with the notch 30 in the stationary shaft 11. A compression spring 27 acts within the retaining chamber 24 to bias the lock piece towards the stationary fork shaft 11.

FIG. 10 shows a fourth embodiment of the retaining mechanism described herein. The fourth embodiment is different in construction from the prior embodiments. In this fourth embodiment, the third shift fork 19 is formed such that the retaining chamber 24, which is open to the movable shaft 12 and the fixed shaft 11, is very shallow. A lock ball 58 is fitted within the retaining chamber 24 such that part of its surface protudes from the retaining chamber 24 so as to engage with the notches 29 and 30 in the movable shaft 12 and fixed shaft 11, respectively.

While the alternative embodiments of the retaining mechanism 300 for the third shift fork 19 are described above, its anticipated that with a slight adaptation, these embodiments may also be used with the retaining mechanisms 100 and 200 for the first and second fork shafts 13 and 18, respectively.

The operation of the preferred embodiment is described as follows. When the first shift fork 13 is moved to the right of its disengaged neutral position as shown in FIG. 4, the first speed sleeve 6 is also shifted in the same direction. This acts to engage the first speed gear train I. If the first shift fork 13 is shifted to the left of its disengaged neutral position as shown FIG. 4, the first speed sleeve 6 is also shifted to the left to engage the second speed gear train II. In either case, the aforementioned shift fork 13 is retained in its neutral, first and second speed positions by the first retaining mechanism 100.

If the second shift fork 18 is moved to the right from its neutral position as shown in FIG. 4, the second speed sleeve 7 is also shifted to the right to engage the third speed gear train III. If the second shift fork 18 is moved to the left of its neutral position as shown in FIG. 4, the second speed sleeve 7 is also moved to the left to engage the fourth speed gear train IV. If, as mentioned above, the second shift fork 18 is moved to the left or the right as viewed in FIG. 4, the third retaining mechanism 300 disposed in the third shift fork 19 acts to maintain the position of the movable fork shaft 12. The second retaining mechanism 200 disposed in the second shift fork 18 will retain the second shift fork 18 in its selected position as described above with respect to the first retaining mechanism 100.

If the movable fork shaft 12 is moved from its neutral position to the right, as viewed from FIGS. 4 and 7–10, the third shift fork 19 is shifted in the same direction through the stopper ring 32 such that the third speed sleeve 8 engages the fifth speed gear train V. In this case, the lower retaining means of the retaining mechanism 300 is disengaged from the notch 30 in the stationary fork shaft 11 and retained against the surface of the stationary shaft 11. If the movable fork shaft 12 is slid from the neutral position to the left as viewed in the figures, the third shift fork 19 will not move to the left due to the one-way action of the stopper ring 32. As a result, the lower retaining means of the third retention mechanism 300 will continue to be engaged with the notch 30 in the stationary shaft 11 and the fifth speed gear train V will be disengaged.

When the third shift fork 19 is disengaged from the fifth speed gear train V, the U-shaped end 33b of the reverse actuating member arm 33a tends to stop the rotation of the movable shaft 12. After the movable shaft 12 has been stopped, only the movable fork shaft 12 will move from the neutral position shown in FIG. 7A to the left as shown in FIG. 7C, thereby moving the reverse actuating member 33 to the left. This motion of the reverse actuating member 33 tends to swing the reverse shift fork 36 so as to engage the reverse idle gear 10, as shown in phantom in FIG. 3, thereby engaging the reverse gear train R.

While a preferred embodiment of the present invention has been described hereinabove with reference to a transmission with five forward speeds and one reverse speed, it is intended that this description be used for the purposes of illustration only and should not be construed to limit the scope of the appended claims.

We claim:

1. A multi-speed transmission having a plurality of forward speed gear trains and at least one reverse speed gear train, comprising, a pair of parallel fork shafts, one said shaft being fixed, the other said shaft being slidable along its axial direction, means to selectively engage the gear trains and means to retain said selective engagement means in the selected position, and said means to selectively engage the gear trains including a first shift fork connected to said fixed fork shaft so as to slide to either side of its disengaged neutral position, a second shift fork connected to said slideable fork shaft so as to slide to either side of its disengaged neutral position, a third shift fork connected to said slidable fork shaft so as to slide in one direction by motion of said slideable fork shaft to only one side of its disengaged neutral position, a reverse shift fork connected to said slideable fork shaft and adapted to be actuated by motion of said slideable fork shaft in a direction opposite to the direction of the said motion which engages said third shift fork.

2. A multi-speed transmission as set forth in claim 1 wherein said means to retain said selective engagement means in the selected position includes an internal chamber formed in said first, second and third shift forks, each chamber being opened to said stationary shaft and said third fork chamber also being opened to said movable shaft, notches formed in said stationary shaft corresponding to each said shift fork chamber opening when said first shift fork is in its neutral and engaged positions, when said second shift fork is in its neutral and engaged positions, and when said third shift fork is in its neutral position, a notch formed in said movable shaft above said third fork chamber opening to said movable shaft so as to be vertically aligned with said corresponding notch in said stationary shaft when said third fork is in its disengaged neutral position.

3. A multi-speed transmission having a plurality of forward speed gear trains and at least one reverse speed gear train, comprising, a fixed fork shaft, a movable fork shaft, said movable fork shafts being substantially parallel to said fixed fork shaft and slidable in the axial direction thereof, a plurality of shift forks to selectively engage the gear trains, a first said shift fork engageable with the highest forward speed gear train being adapted to be slidable along said movable shaft in a first direction only from a neutral position, a second said shift fork engageable with the reverse speed gear train having means connected to the movable shaft for allowing said movement of the movable shaft in the first direction without moving said second shift fork and for causing movement of said second shift fork upon movement of said movable shaft in a second direction only, said first direction being opposite said second direction, means to retain said shift forks which are engageable with all but the highest forward speed gear train and the reverse speed gear train in their neutral and engaged positions and means to retain said first and second shift forks engageable with the highest forward speed gear train and the reverse speed gear train in their neutral position.

4. A multi-speed transmission as set forth in claim 3 wherein said means to retain said shift forks includes a chamber formed within at least one of said first and second shift forks and having communication with at least said stationary shaft, notches formed in said movable and stationary fork shafts corresponding to said chamber openings, and retractable protrusions engageable with said notches.

* * * * *